United States Patent Office 3,360,912
Patented Jan. 2, 1968

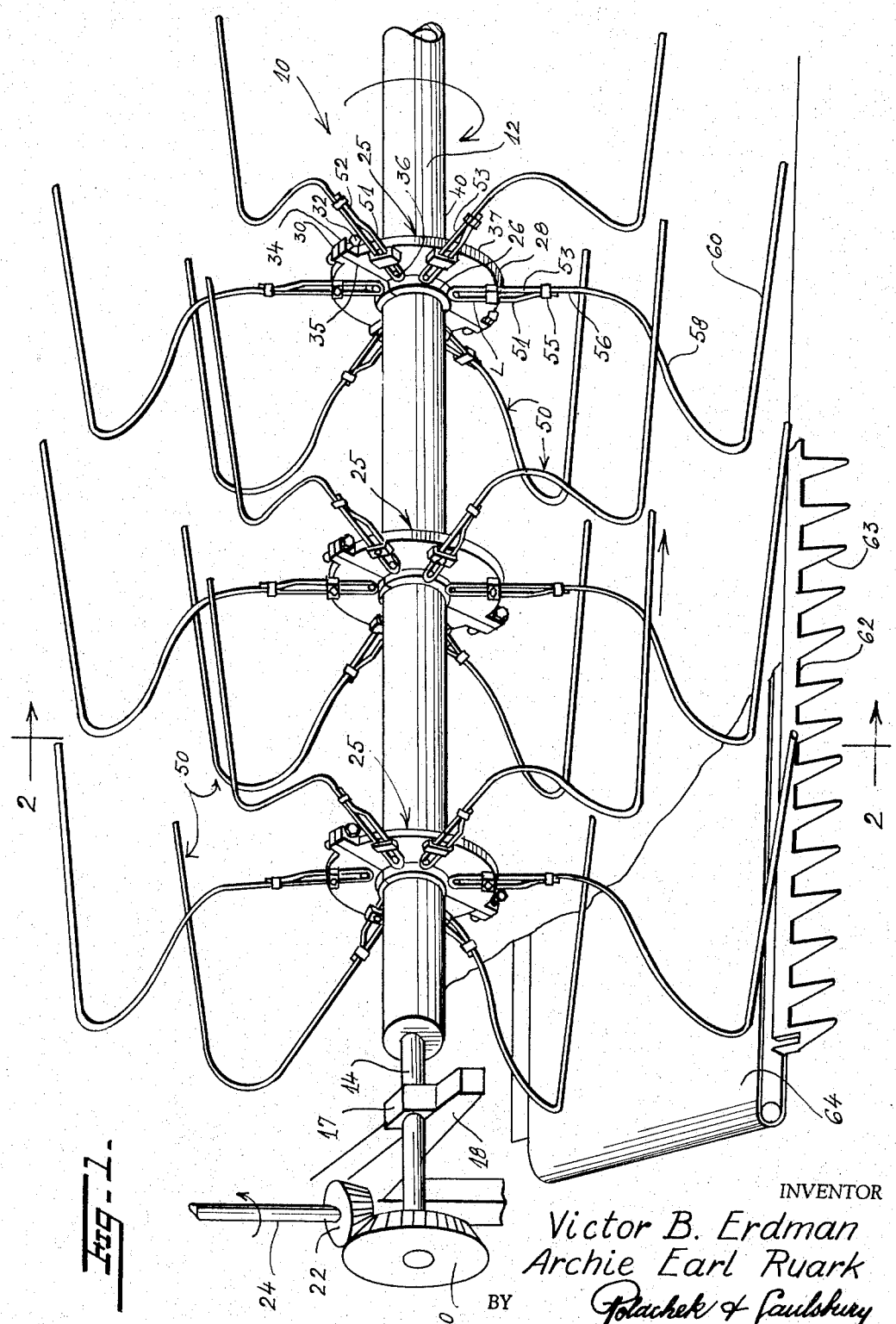

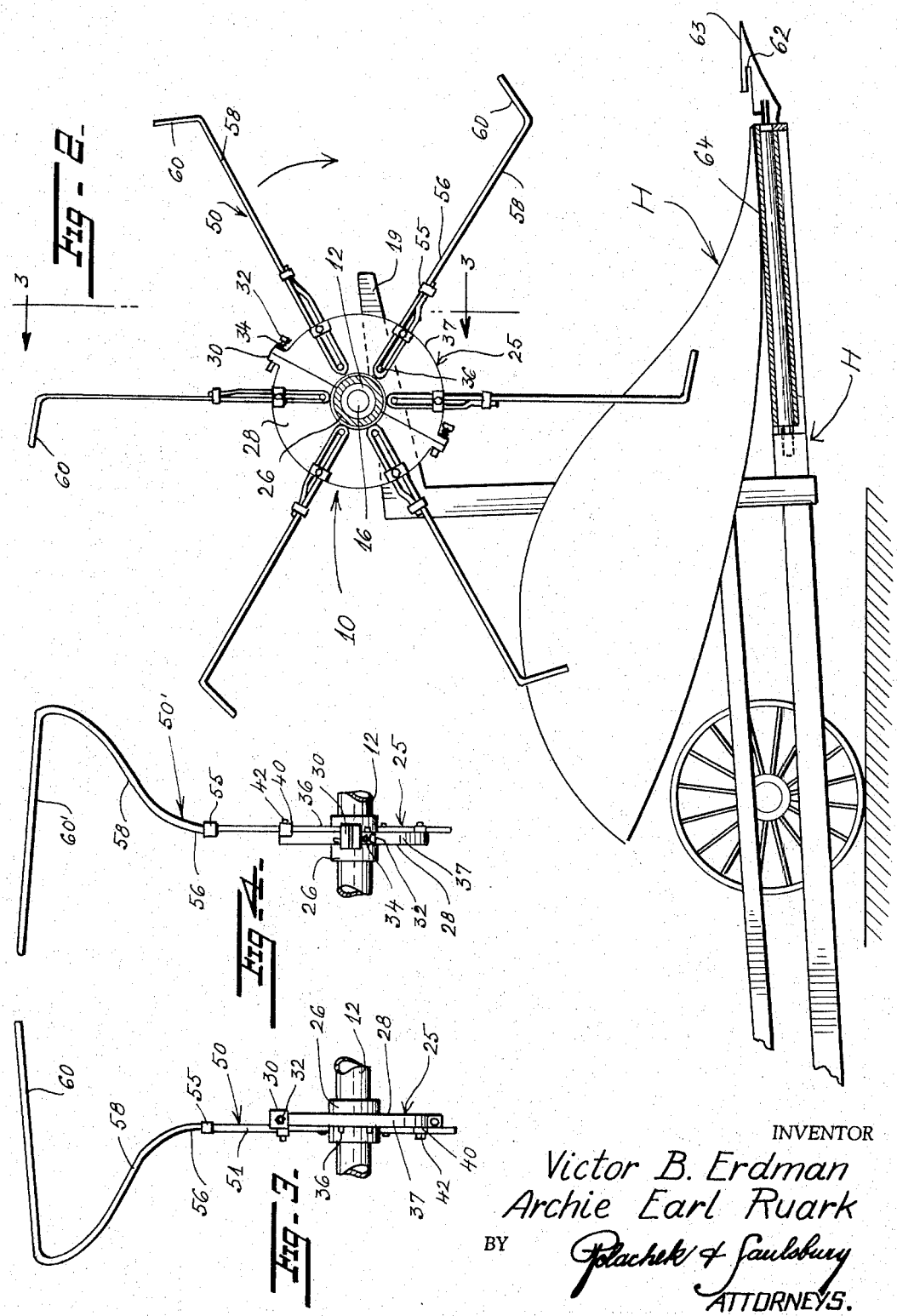

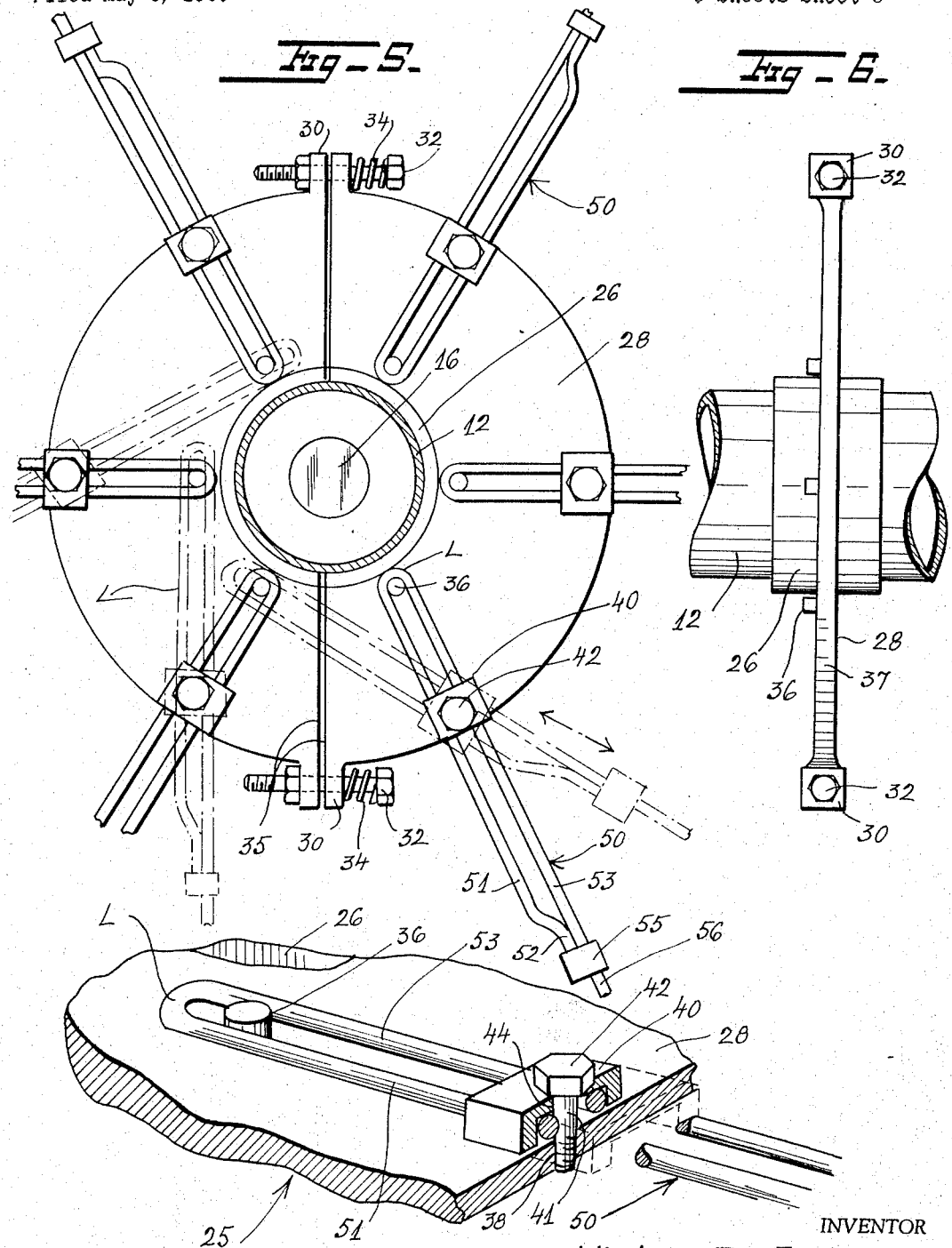

3,360,912
HARVESTER REEL
Victor B. Erdman, 2602 4th Ave. S., Lethbudge, Alberta, Canada, and Archie Earl Ruark, Box 700, High River, Alberta, Canada
Filed May 3, 1965, Ser. No. 452,701
7 Claims. (Cl. 56—220)

ABSTRACT OF THE DISCLOSURE

A sweep unit for a harvester unit mounted on a horizontal rotatable axle. The unit has a hub with spring loaded clamping flanges engaging the axle so that upon application of an excessive load due to encountering an obstruction the hub slips on the axle while the axle continues to rotate.

---

This invention concerns a harvester reel with flexible sweep arms.

Heretofore conventional harvester reels have been provided with a number of flat slats, bars or bats mounted in radial positions around a rotating shaft, with short tines extending radially outward of the slats. Such reels are described in United States Patent 2,115,385 and 2,144,905. The conventional types of reels have a number of difficulties and disadvantages. One difficulty encountered is the tendency of straw to collect and remain on the slats and tines reducing the efficiency of operation. A further disadvantage is that the solid slats or bars obscure the operator's view in the direction of travel of the harvester. Furthermore, the slats and tines are not readily interchangeable in harvester reels of different sizes and designs; the rigid tines and slats are frequently damaged on encountering obstructions, stones, and other obstacles; the reels are very heavy; the number of angular spacing of the slats and lateral spacing of the tines cannot be changed; and moving parts of the reels need lubrication, wear out quickly and require frequent costly repairs.

The present invention is directed at overcoming the above and other difficulties and disadvantages in a lighter, more versatile, more economical and more durable reel structure.

According to the invention there is provided a harvester reel in which a plurality of sweep units are mounted on a horizontal rotatable axle. The units have hubs with spring loaded clamping flanges engaging the axle so that upon application of an excessive load due to encountering an obstruction the hubs slip on the axle while the axle continues to rotate. The units can be spaced apart different selected distances axially along the axle. Each of the units includes a circular disk-like body having two coplanar semicircular plate members. These plate members support rod-like sweep arms in different adjustable positions. The sweep arms may be arranged so that their free ends extend angularly outward from the direction of rotation of the reel. This provides the important advantage that any straw that might otherwise hang on the sweep arms, slides off the arms into a conveyor as the sweep arms rise. The straw does not wrap up or hang on the sweep arms as occurs in prior harvester reels.

The sweep arms do not materially disturb or shake standing heads of grain during operation of the reel, as the arms slip down into the grain. The grain heads remain undisturbed while the sweep arms bend down the straw for efficient cutting by the harvester sickle. Grain heads are not shaken to the ground prior to cutting as occurs in prior harvester reels using rigid slats, bars or bats.

The rod-like arms and radially mounted hubs and hub plates do not obscure the view of the operator of the harvester so that he can observe how the reel arms place the grain on the conveyor of the harvester.

The rod-like sweep arms are flexible so that they bend and by-pass obstructions which would break rigid arms, tines and slats used on prior harvester reels. Thus breakage of the sweep arms due to such obstructions are avoided. The spring tensioned clamp hubs further act as slip clutches when greater obstructions are encountered, so that there is further protection against breakage of the sweep arms.

If necessary the reel can be lowered so that the flexible arms scrape the cutting bar of the harvester without damage to the reel parts in case tangles of straw or short stands of grain are encountered. This cannot be done with conventional reels since their parts would jaw or break if they scraped the cutting bar and guide teeth.

The diameter of the reel can be changed by readjusting the positions of the arms on the hubs. A short diameter can be had when working against an auger conveyor is required, and a longer diameter can be had when working with a table conveyor. Since the sweep units can be adjusted in diameters and can be adjustably spaced on the reel axle, they can be interchanged from one type of harvester needing one size units to another harvester needing another size of sweep units.

The arms of several units can be arranged to overlap each other without interference with one another, thus a double reel can readily be made by overlapping or doubling the units.

The new and improved harvester reel is economical to manufacture, easy to assemble, and requires only minimum maintenance. Due to the open construction of the reel it can stand high winds or storms which would overturn or damage a conventional reel made of solid slats, bats or bars.

It is therefore a principal object of the invention to provide a harvester reel including an axle on which are adjustably mounted a plurality of sweep units each including a plurality of radially extending angular sweep arms.

A further object is to provide a reel as described wherein the sweep units can be arranged with the arms overlapping to form a continuous series of sweepers so that no grain is missed and all grain is swept into the harvester.

Another object is to provide a novel unit for a harvester reel including a circular disk body to which are removably attached clamps holding radial sweep arms oriented in the direction of flow of grain on to the table of the harvester.

A further object is to provide a sweep unit for a harvester reel as described, wherein the clamps are arranged to hold the ends of the sweep arms oriented with rearward trailing ends at angles to their direction of rotation, so that grain tending to hang on the sweep arms drops on the table of the harvester as the sweep arms rise after sweeping grain on to the harvester table.

Another object is to provide a harvester reel with sweep units as described, wherein the disk bodies having hubs slidingly mounted on the axle of the reel to slip on the axle independently of each other when obstacles are encountered by the reel, so that the reel can continue to rotate, and wherein the sweep arms are very tough and strong but sufficiently flexible to bend and yield when obstacles are encountered without stopping rotation of the reel.

For further comprehension of the invention, and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a perspective view of part of harvester reel embodying the invention shown mounted in a harvester.

FIG. 2 is a vertical sectional view taken on line 2—2 of FIG. 1.

FIG. 3 is a fragmentary side view taken on line 3—3 of FIG. 2.

FIG. 4 is a view similar to FIG. 3 showing a sweep unit with reversed sweep arm.

FIG. 5 is an enlarged sectional view similar to a part of FIG. 2.

FIG. 6 is an end view of the sweep unit of FIG. 5, with sweep arms removed.

FIG. 7 is a perspective view of parts of a sweep unit including a hub plate, sweep arm and clamp.

Referring to FIGS. 1–3, there is shown a harvester reel 10 including a horizontal tubular axle 12 having axial shaft ends 14, 16. The shaft ends may be supported in bearings 17 on frame bars 18, 19 of the grain harvester H at opposite ends of the reel. Gear 20 is carried on shaft end 14 and this is driven by a drive gear 22 mounted on a drive shaft 24, which may be rotated by a conventional power take-off from the harvester, via a suitable gear train such as described in the above mentioned prior patents.

Mounted on the axle 12 in axially spaced positions is a plurality of sweep units 25. Each unit includes two similar semicircular flanges 26 arranged circumferentially of the axle to define an annular hub. Extending radially from each flange and integral therewith is a semicircular flat metal plate 28. The two plates 28 of the unit 25 define a single circular disk-like body. Threaded abutted ears 30 extend outwardly of the plates 28 at diametrically opposite positions. Bolts 32 secure the ears together with coil springs 34 interposed between the heads of the bolts and the adjacent ears of the hub plates; see FIGS. 5, 6. The plates are thus held in coplanar position abutted at their diametral faces 35. The coil springs 34 are slightly expanded and tensioned so that the units 25 can turn or slip on the axle 12 if the units encounter obstacles offering sufficient resistance to prevent the units from turning. It will be noted that the units 25 can slip on the axle independently of each other, so that the reel with other units 25 can continue to turn even though any one unit is prevented from turning on the axle.

Each of the hub plates 28 is provided with a plurality of pins 36 circumferentially spaced around and slightly spaced radially from flange 26. Spaced radially from the pin near the arcuate periphery 37 of the plate is a threaded hole 38. A rectangularly U-shaped clamp plate 40 can be mounted over the hole 38 and bolt 42 can be screwed into hole 38. The shank 41 of the bolt will extend through hole 44 in the top of the plate 40, which hole is aligned with hole 38; see FIG. 7.

Each of the units 25 includes a plurality of rod-like arms 50. Each arm has a rather rigid end loop L formed by bending one end 51 of the arm parallel to an intermediate portion 53 and securing bent free end 52 to an intermediate point of the arm portion 53 by a slidable, flat ring 55. Each arm 50 has an intermediate straight portion 56 extending outwardly beyond ring 55. Bent angularly to straight portion 56 is an intermediate sweep portion 58. Bent angularly to portion 58 so that it extends about 90° to the straight portion 58 is a free end portion 60 of the arm.

The looped rod ends 51, 53 extend through clamp plate 40 laterally of the shank 41 of bolt 42. The end of the loop engages on a pin 36. In this position of the arm, the flexible end portion 60 extends angularly outward to the vertical plane of rotation of the reel as clearly shown in FIG. 1. The arm ends 60 sweep angularly over the cutter bar 62, teeth 63 and conveyor table 64. The arm ends 60 incline downwardly as they turn inwardly of the harvester table so that loose grain hanging on the arms slides off the arms on to the table 64 as indicated by arrow A in FIG. 1. The arm ends 60 of each unit 25 can be arranged to overlap the arm ends of the adjacent units as shown in FIG. 1 so that no standing grain is missed as the arms sweep the grain over the table 64 and against the cutter bar 62 and over the table 64.

Instead of arranging the straight rod ends 51, 53 of the loop L radially to the axle and hub, rod-like arms 50 may be disposed somewhat chordally as shown by dot and dash lines in FIG. 5. The loop L is turned angularly from its solid line radial position to the chordal dot and dash line position to engage on an adjacent pin 36. In this arrangement as shown in solid lines in FIG. 7, the loop L is slidably adjustable on the hub plates 28 so that the flexible portions 56, 58, 60 of the arm 50 can extend radially outward of the hub plate and axle to a greater or lesser extent. Thus the overall diameter of the reel can be adjusted to the size and requirements of the harvester. The arm ends 60 can be located quite close to the cutter bar 62 and may even scrape over them. The flexibility of the sweep arms is a decided advantage in such an arrangement since they will not be damaged if they encounter the cutter bar 62 or teeth 63 but will bend and slide free.

If the harvester has a center feed arrangement, it will be desirable to arrange the units on axle 12 so that in one half the reel, the sweep arm portions 60 extend angularly outward to the right as shown in FIGS. 1 and 3, while the end portions 60' of sweep arms 25' in the units 25' of the other half of the reel extend angularly outward to the left as shown in FIG. 4.

It will be noted that if any sweep arm needs replacement, it can readily be removed by disengaging the single bolt 42'. Longitudinal adjustment of the arm needs only loosening of the bolt and then retightening after resetting the sweep arm. All parts of the reel are very rugged in construction and require minimum maintenance. There are no moving levers or any complicated mechanism. The slip clutch action is foolproof and very simple in construction. If one sweep unit is stalled the flexible overlapped arms of adjacent units continue to slide past the arms of the stalled unit. The reel 10 can be quickly assembled with no particular skill required.

A simple type of tool such as a lug wrench is sufficient for assembly, adjustment and disassembly. The reel can be very economically manufactured and replacement parts are inexpensive. The entire structure is basically simple, nevertheless the performance of the reel is superior to that of conventional reels. The open flexible structure of the reel avoids loss of grain by sliding in between the grain heads without shaking them loose. A complete view through the reel of the grain gathering and cutting operations is provided to the operator while the reel is rotating.

While we have illustrated and described the preferred embodiments of our invention, it is to be understood that we do not limit ourselves to the precise constructions herein disclosed and that various changes and modifications may be made within the scope of the invention as defined in the appended claims.

What is claimed is:

1. A sweep unit for a harvester unit comprising a circular disk body having a hub ring engageable on a rotatable axle, a plurality of sweep arms, and clamps removably and adjustably holding the sweep arms on said body, said arms having end portions rigid enough to sweep grain into the harvester and flexible enough to bend elastically when encountering obstacles to rotation of the arms so that the arms slip past the obstacles.

2. A sweep unit for a harvester unit comprising a circular disk-like body formed by two semicircular plates, arcuate flanges integral with said plates respectively, said plates having ears at diametrically opposite positions, ears of the two plates being disposed in abutment, bolts with interposed springs yieldably holding the plates in coplanar diametral edge abutment to define said disk-like body while said flanges cooperatively engage a cylindrical rotatable axle to define a ring-like hub thereon, a plurality of rod-like sweep arms each arm having a rigid loop at one end and flexible portion at the other end, and clamps removably and adjustably holding the sweep arms on said plates with the flexible ends of the sweep arms disposed radially outward of the central axis of said disk-like body and angularly to the plane of said body, whereby the flexible ends of the arms will bend elastically to slide past an obstacle while the arms continue to rotate, and whereby the disk-like body will slip on said axle when the arms encounter an obstruction sufficient to stop rotation of said body while the axle continues to rotate.

3. A harvester reel, comprising a rotatable axle, a plurality of sweep units mounted on said axle in spaced positions axially of said axle, each of said units including a circular disk-like body formed by two semicircular plates, arcuate flanges integral with said plates respectively, said plates having ears at diametrically opposite positions, each of the two plates being disposed in abutment, bolts with interposed springs yieldably holding the plates in coplanar diametral edge abutment, said flanges defining a ring-like hub engaging said axle, said springs holding the hub in engagement with the axle, said hub being slidable rotationally on said axle when said body is prevented from rotation while the axle rotates, a plurality of rod-like sweep arms, each arm having a rigid loop at one end and a free other end, clamps on said body detachably engaging the loops to hold the free ends of the arms extending radially outward of said body and at an angle to the plane thereof, whereby the free ends of the arms will sweep a stand of grain into the harvester while the axle rotates, and whereby loose grain hanging on any of the free ends of the arms will fall into the harvester as the arms rise while pointing downward inside the harvester.

4. A harvester reel, comprising a rotatable axle, a plurality of sweep units mounted on said axle in spaced positions axially of said axle, each of said units including a circular disk-line body formed by two semi-circular plates, arcuate flanges integral with said plates respectively, said plates having ears at diametrically opposite positions, each of the two plates being disposed in abutment, bolts with interposed springs yieldably holding the plates in coplanar diametral edge abutment, said flanges defining a ring-like hub engaging said axle, said springs holding the hub in engagement with the axle, said hub being slidable rotationally on said axle when said body is prevented from rotation while the axle rotates, a plurality of rod-like sweep arms, each arm having a rigid loop at one end and a free other end, clamps on said body detachably engaging the loops to hold the free ends of the arms extending radially outward of said body and at an angle to the plane thereof, whereby the free ends of the arms will sweep a stand of grain into the harvester while the axle rotates, and whereby loose grain hanging on any of the free ends of the arms will fall into the harvester as the arms rise while pointing downward inside the harvester, each of the free ends of the sweep arms being flexible to yield elastically when encountering an obstacle so that the units can continue to rotate with the axle, and whereby when any one unit is stalled and slips on the axle because the arms of said one unit encounter an obstacle which holds the arms stationary, the remainder of the units will continue to rotate with the axle.

5. A harvester reel, comprising a rotatable axle, a plurality of sweep units mounted on said axle in spaced positions axially of said axle, each of said units including a circular disk-like body formed by two semi-circular plates, arcuate flanges integral with said plates respectively, said plates having ears at diametrically opposite positions, each of the two plates being disposed in abutment, bolts with interposed springs yieldably holding the plates in coplanar diametral edge abutment, said flanges defining a ring-like hub engaging said axle, said springs holding the hub in engagement with the axle, said hub being slidable rotationally on said axle when said body is prevented from rotation while the axle rotates, a plurality of rod-like sweep arms, each arm having a rigid loop at one end and a free other end, clamps on said body detachably engaging the loops to hold the free ends of the arms extending radially outward of said body and at an angle to the plane thereof, whereby the free ends of the arms will sweep a stand of grain into the harvester while the axle rotates, and whereby loose grain hanging on any of the free ends of the arms will fall into the harvester as the arms rise while pointing downward inside the harvester, each of the free ends of the sweep arms being flexible to yield elastically when encountering an obstacle so that the units can continue to rotate with the axle, and whereby when any one unit is stalled and slips on the axle because the arms of said one unit encounter an obstacle which holds the arms stationary, the remainder of the units will continue to rotate with the axle, said units being spaced close enough to each other axially of said axle so that the free ends of the arms of each unit overlap free ends of arms of adjacent units to avoid missing any grain standing in a line parallel to the axis of the axle.

6. A harvester reel, comprising a rotatable axle, a plurality of sweep units mounted on said axle in spaced positions axially of said axle, each of said units including a circular disk-like body formed by two semi-circular plates, arcuate flanges integral with said plates respectively, said plates having ears at diametrically opposite positions, each of the two plates being disposed in abutment, bolts with interposed springs yieldably holding the plates in coplanar diametral edge abutment, said flanges defining a ring-like hub engaging said axle, said springs holding the hub in engagement with the axle, said hub being slidable rotationally on said axle when said body is prevented from rotation while the axle rotates, a plurality of rod-like sweep arms, each arm having a rigid loop at one end and a free other end, clamps on said body detachably engaging the loops to hold the free ends of the arms extending radially outward of said body and at an angle to the plane thereof, whereby the free ends of the arms will sweep a stand of grain into the harvester while the axle rotates, and whereby loose grain hanging on any of the free ends of the arms will fall into the harvester as the arms rise while pointing downward inside the harvester, each of the free ends of the sweep arms being flexible to yield elastically when encountering an obstacle so that the units can continue to rotate with the axle, and whereby when any one unit is stalled and slips on the axle because the arms of said one unit encounter an obstacle which holds the arms stationary, the remainder of the units will continue to rotate with the axle, means for supporting and rotating said axle in a horizontal position in a harvester movable through a field of grain, said units being spaced close enough to each other on said axle so that free ends of the arms of each unit overlap arms of adjacent units to avoid missing any grain presented to the arms while the harvester moves along said field.

7. A harvester reel, comprising a rotatable axle, a plurality of sweep units mounted on said axle in spaced positions axially of said axle, each of said units including a circular disk-like body formed by two semi-circular plates, arcuate flanges integral with said plates respectively, said plates having ears at diametrically opposite positions, each of the two plates being disposed in abutment, bolts with interposed springs yieldably holding the plates in coplanar diametral edge abutment, said flanges defining a ring-like hub engaging said axle, said springs holding the hub in engagement with the axle, said hub being slidable rotationally on said axle when said body is prevented from rotation while the axle rotates, a plurality of rod-like sweep arms, each arm having a rigid loop at one end and a free other end, clamps on said body detachably engaging the loops to hold the free ends of the arms extending radially outward of said body and at an angle to the plane thereof, whereby the free ends of the arms will sweep a stand of grain into the harvester while the axle rotates, and whereby loose grain hanging on any of the free ends of the arms will fall into the harvester as the arms rise while pointing downward inside the harvester, each of the free ends of the sweep arms being flexible to yield elastically when encountering an obstacle so that the units can continue to rotate with the axle, and whereby when any one unit is stalled and slips on the axle because the arms of said one unit encounter an obstacle which holds the arms stationary, the remainder of the units will continue to rotate with the axle, means for supporting and rotating said axle in a horizontal position in a harvester movable through a field of grain, said units being spaced close enough to each other on said axle so that free ends of the arms of each unit overlap arms of adjacent units to avoid missing any grain presented to the arms while the harvester moves along said field, the free ends of the arms of one half of the units on the axle pointing angularly in one direction toward a central plane perpendicular to said axle while the free ends of the arms in the other half of said units on the axle point angularly in an opposite direction toward said central plane when the harvester has a centrally located feed arrangement.

References Cited

UNITED STATES PATENTS

| | | | |
|---|---|---|---|
| 372,068 | 10/1887 | Hale | 56—220 |
| 473,072 | 4/1892 | Knutson | 56—220 |
| 2,134,239 | 10/1938 | Sells | 56—220 |
| 2,867,965 | 1/1959 | Goodall et al. | 56—377 |
| 3,057,145 | 10/1962 | Van der Lely | 56—377 |

ABRAHAM G. STONE, *Primary Examiner.*

ANTONIO F. GUIDA, *Examiner.*